Dec. 19, 1922. 1,439,322.
L. PAVIA.
SHUTTLE.
FILED DEC. 5, 1921.
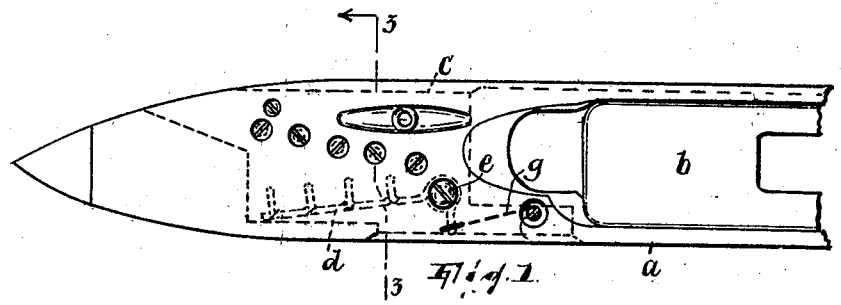
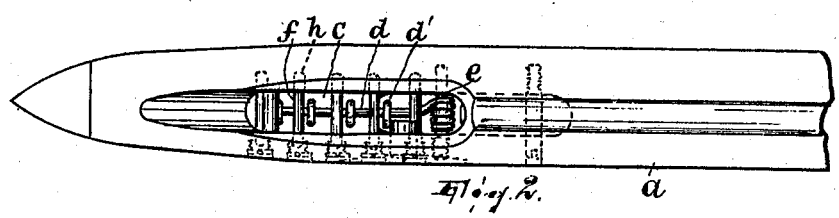
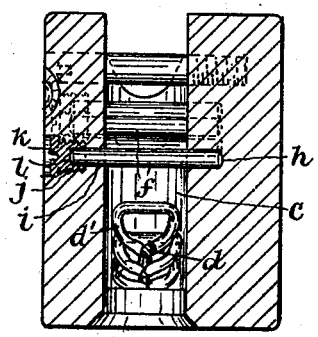
WITNESS
INVENTOR
Luigi Pavia,
ATTORNEY Patented Dec. 19, 1922.

1,439,322

UNITED STATES PATENT OFFICE.

LUIGI PAVIA, OF ALLENTOWN, PENNSYLVANIA.

SHUTTLE.

Application filed December 5, 1921. Serial No. 519,311.

*To all whom it may concern:*

Be it known that I, LUIGI PAVIA, a subject of the King of Italy, residing at Allentown, in the county of Lehigh and State of Pennsylvania, have invented certain new and useful Improvements in Shuttles, of which the following is a specification.

This invention relates to tension means for shuttles in which thread guides are formed by straight pins set in the shuttle body. Usually these pins are embodied in the shuttle by drilling holes in the shuttle body part way through the same, fitting the pins in the holes and then filling in the exposed ends of the holes, to cover the outer ends of the pins, with wax or other suitable plastic material. The pins become worn with nicks by the thread, and to remove them and reinsert them in changed positions or substitute for them new ones cannot well be done by the weaver himself, who is generally without the necessary plastic material to complete the work and also lacks the skill to do it properly. My object is to provide for mounting the pins so that the weaver himself, or any other unskilled person, can change the positions of the pins or substitute for them new ones when they are worn; a further object is to make provision for the accurate centering of the pin when the work of repositioning the pin or equipping it with a new one is completed.

In the drawing,

Figure 1 is a plan view of a fragment of a shuttle embodying my invention;

Figure 2 is a side elevation, showing the shuttle inverted; and

Figure 3 is a sectional view on the line 3—3 of Fig. 1.

The shuttle body $a$ has the cavity $b$ for the wound package and, forward of such cavity, the usual cavity $c$ for the tension means (to be described), cavity $c$ extending through the shuttle from one side to the other.

A well known type of tension means is shown, the same consisting of a member $d$ which is pivoted on a stud $e$ and has loops $d'$ to form thread guides, and a series of parallel pins $f$ which form fixed thread guides, the thread being adapted to extend zig-zig fashion back and forth around the pins $f$ and through the loops $d'$ alternately. and when under tension to shift the member $d$ against the tension of a spring $g$ from the position shown in Fig. 1 to a position where the thread would extend more or less straight.

Ordinarily the pins $f$ are stepped in holes $h$ which reach toward but not to the adjoining exterior face of the shuttle (in the present case, the bottom face of the shuttle which in Fig. 2 is shown uppermost), their outer ends being in corresponding holes drilled in alinement with the holes $h$ from the other or top face of the shuttle through to the cavity.

In the present invention said pins are stepped in the holes, as $h$, as before. And they also pass through holes $i$ drilled through the shuttle body in alinement with the holes $h$ from the top face of the shuttle to the cavity $c$. But the holes $i$ have countersinks $j$, which are threaded, and into these countersinks are tapped the screws $k$, each screw having at its inner end an axial recess $l$ in which the corresponding pin is stepped and in which it fits snugly the same as it does in the hole $h$.

If a pin becomes worn with a nick or otherwise and requires to be shifted rotatively or to be removed and a new one substituted the screw $k$ is removed, the necessary change made and then the screw returned and made to bind the pin again in place.

I have found that it is important to provide the screw with an axial recess, and especially a cylindrical one, in which the pin is stepped and which it snugly fits. This not only centers the pin, as it would not if the pin were centered by being made to fit only the hole $i$ snugly, because removals of the pin would in time enlarge or otherwise distort the hole, or if it were stepped in a merely conical hole in the screw, because in this case slight withdrawal of the screw would lead to looseness and consequent ability of the pin to shift out of centered position; it prevents the pin from turning. If the pin is alloyed to turn on its own axis it will eventually work around until the nick already formed is again tracked by the thread, and remain in that position, thus defeating the principal purpose of the invention.

Having thus fully described my invention, what I claim as new and desire to secure by Letters Patent is:—

1. The combination of a shuttle body having a cavity therein and a hole extending from one outer face of the body to the cavity and another hole alined with the first hole and extending from the cavity toward but not to the opposite face of the body, the outer part of the first hole being a countersink, a pin snugly fitting the inner part of said first hole and stepped at one end in and held centered by the second hole, and a screw tapped into the countersink and binding the pin against its step in the second hole.

2. The combination of a shuttle body having a cavity therein and a hole extending from one outer face of the body to the cavity and another hole alined with the first hole and extending from the cavity toward but not to the opposite face of the body, a pin stepped at one end in and held centered by the second hole, and a screw tapped into the first hole and binding the pin against its step in the second hole, said screw having an axial cylindrical recess in which the other end of the pin is stepped and which it snugly fits.

In testimony whereof I affix my signature.

LUIGI PAVIA.